United States Patent
Wallace

(10) Patent No.: US 7,639,999 B2
(45) Date of Patent: Dec. 29, 2009

(54) SYSTEM FOR DIVERSE PATH ANTENNA SELECTION

(75) Inventor: Raymond C. Wallace, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 624 days.

(21) Appl. No.: 11/102,064

(22) Filed: Apr. 8, 2005

(65) Prior Publication Data
US 2006/0264193 A1 Nov. 23, 2006

(51) Int. Cl.
*H04B 7/00* (2006.01)
(52) U.S. Cl. .................. 455/277.1; 375/347
(58) Field of Classification Search ......... 455/562.1, 455/101, 135, 137, 277.1, 277.2; 375/267.1, 375/347
See application file for complete search history.

(56) References Cited

U.S. PATENT DOCUMENTS

| | | | |
|---|---|---|---|
| 5,621,770 A | * | 4/1997 | Zastera ............ 375/347 |
| 5,634,206 A | * | 5/1997 | Reed et al. ............ 455/277.2 |

2004/0198473 A1 10/2004 Tran

FOREIGN PATENT DOCUMENTS

| | | |
|---|---|---|
| EP | 1659707 | 5/2006 |
| EP | 1659707 A2 | 5/2006 |
| GB | 2353673 | 2/2001 |
| GB | 2353673 A | 2/2001 |

OTHER PUBLICATIONS

International Search Report - PCT/US06/013119 - International Search Authority - European Patent Office - Feb. 6, 2006.
Written Opinion - PCT/US06/013119 - International Search Authority - European Patent Office - Feb. 6, 2007.
International Preliminary Report on Patentability - PCT/US06/013119 - International Bureau Of WIPO - Switzerland - Oct. 9, 2007.

* cited by examiner

*Primary Examiner*—Thanh C Le
(74) *Attorney, Agent, or Firm*—Kenneth Vu

(57) ABSTRACT

System for diverse path antenna selection. A method is provided for receiving a signal in a communication device having first and second antennas. The method includes receiving a first version of the signal using the first antenna, and receiving a second version of the signal using the second antenna. The method also includes determining a first quality indicator and a second quality indicator associated with the first and second versions of the signal, respectively, and selecting one of the first and second versions of the signal to process based on the first and second quality indicators.

27 Claims, 4 Drawing Sheets

SYSTEM FOR DIVERSE PATH ANTENNA SELECTION

BACKGROUND

I. Field

The present invention relates generally to the operation of communication devices, and more particularly, to a system for diverse path antenna selection to receive signals in a communication device.

II. Description of the Related Art

Wireless communication networks are currently in widespread use to allow mobile terminal users to wirelessly communicate with each other and other network entities. Increasingly, mobile terminals are being used to receive both voice communications and data services. However, during operation, mobile terminals may experience the effects of Rayleigh signal fading and/or other transmission distortions that reduce performance. For example, Rayleigh signal fading can occur when multiple out-of-phase versions of the same signal arrive at the receiving antenna. The out-of-phase versions tend to cancel each other and yield a degraded received signal.

One technique used to reduce the effects of signal fading utilizes multiple antennas coupled to primary and diverse receiving paths, respectively, at the receiving device. The antennas are physically space apart from each other, and the primary receive path processes signals received by the first antenna while the diverse receive path processes signals received by the second antenna. By combining the signals on the two receive paths, the effects of signal fading can be reduced. Typically, the second antenna may be incorporated into the housing of the device so as to be less visible. Furthermore, the second antenna and its associated diverse receive path electronics may be constructed using less expensive components and offer lower performance (i.e., less sensitivity) than the first antenna and the primary receive path.

As the availability of wireless services have increased, it would be desirable to be able to receive and process multiple information signals at one time. For example, it is possible for a mobile terminal to receive voice calls, paging messages, data and multimedia services, and positioning signals, such as global positioning signals (GPS). Unfortunately, typical terminals having a static diverse receive path and generally utilize that path only to process signals to reduce transmission effects, such as signal fading. Furthermore, due to cost constraints, the second antenna may not offer the performance of the primary antenna. Thus, current devices are generally limited to processing only one information signal at a time. As a result, the capabilities and functionality of mobile terminals having diverse path processing may be unnecessarily limited and/or underutilized.

Therefore, it would be desirable to have a system that utilizes the diverse receive path in a communication device to provide additional functionality and/or flexibility. For example, it would be desirable to process one or more information signals at the same time in a mobile device.

SUMMARY

In one or more embodiments, a system for diverse path antenna selection is provided that operates to select between primary and diverse receive paths in a communication device. For example, the system is suitable for use in a mobile terminal to allow the terminal to receive and process multiple signals at the same time, thereby providing additional functionality and/or flexibility to the device.

In one embodiment, the system operates to provide several operating modes so that a communication device may fully utilize its diverse receive path processing. For example, in one operating mode, referred to as "optimized signal" mode, the system operates to select between primary and secondary antennas to receive a desired signal with a selected quality level. Thus, the system operates to flexibly utilized diverse receive path processing in the communication device, so that it is not limited to simply reducing transmission effects, such as signal fading, as in conventional systems.

In one embodiment, a method is provided for receiving a signal in a communication device having first and second antennas. The method comprises receiving a first version of the signal using the first antenna, and receiving a second version of the signal using the second antenna. The method also comprises determining a first quality indicator and a second quality indicator associated with the first and second versions of the signal, respectively, and selecting one of the first and second versions of the signal to process based on the first and second quality indicators.

In another embodiment, apparatus is provided for receiving a signal in a device having first and second antennas, wherein the first antenna receives the signal and produces a first version of the signal, and the second antenna receives the signal and produces a second version of the signal. The apparatus comprises a switch coupled to receive the first and second versions of the signal and a control signal, wherein the switch operates to selectively couple one of the first and second versions of the signal to receiving logic based on the control signal. The apparatus also comprises control logic that operates to output the control signal based one or more signal quality indicators associated with the first and second versions of the signal.

In still another embodiment, apparatus is provided for receiving a signal in a communication device having first and second antennas. The apparatus comprises means for receiving a first version of the signal using the first antenna, and means for receiving a second version of the signal using the second antenna. The apparatus also comprises means for determining a first quality indicator and a second quality indicator associated with the first and second versions of the signal, respectively, and means for selecting one of the first and second versions of the signal to process based on the first and second quality indicators.

In still another embodiment, a signal-bearing medium is provided that tangibly embodies a program of machine-readable instructions executable by a digital processing apparatus to perform a method for receiving a signal in a communication device having first and second antennas. The method comprising operations of receiving a first version of the signal using the first antenna, and receiving a second version of the signal using the second antenna. The method also comprises operations of determining a first quality indicator and a second quality indicator associated with the first and second versions of the signal, respectively, and selecting one of the first and second versions of the signal to process based on the first and second quality indicators.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes one or more embodiments of a diverse path selection system for use in a communication device. For example, the system is suitable for use in wireless communication devices that operate to receive voice and data services.

Figure 1:
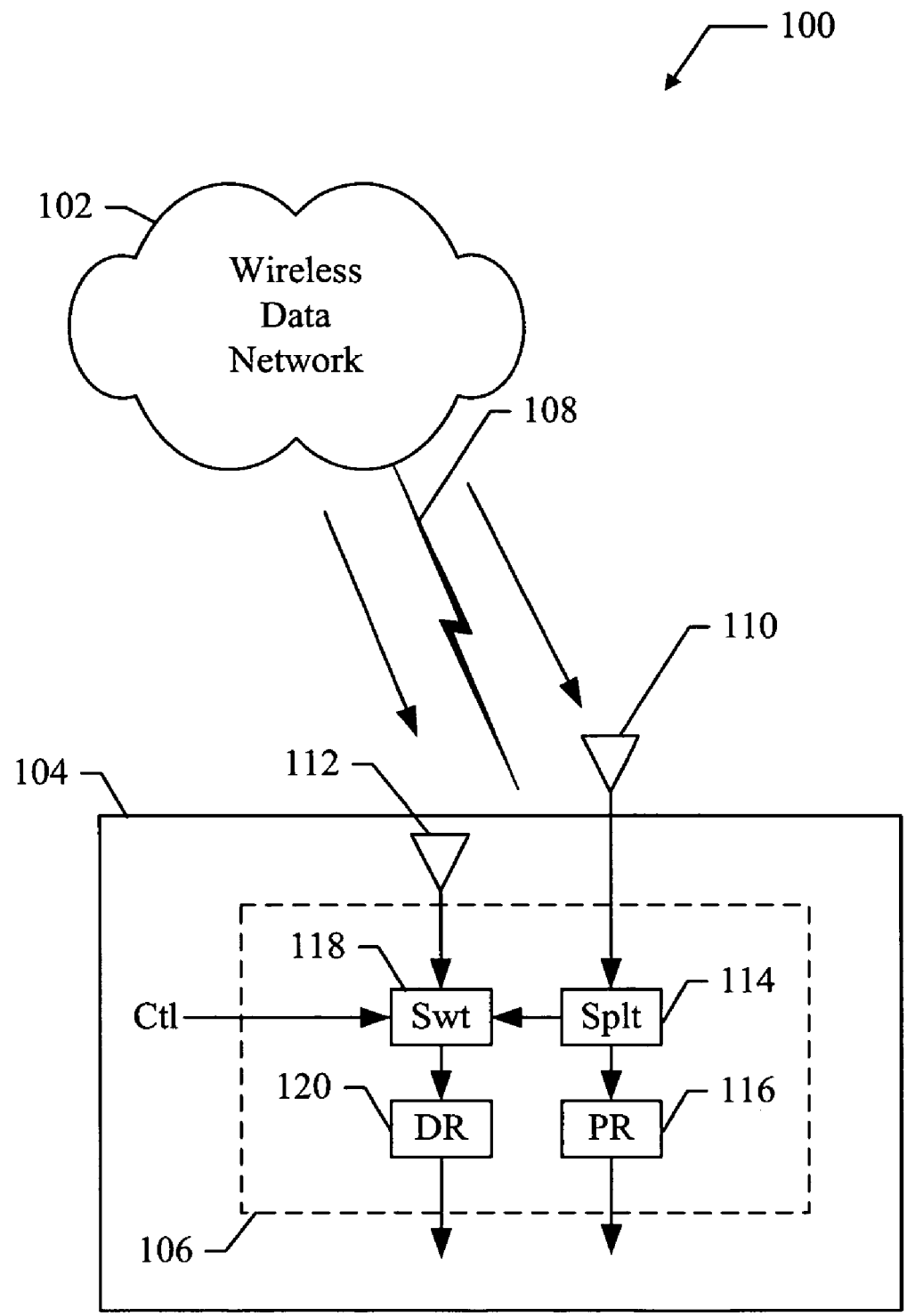
FIG. 1 shows a device in a communication network that includes one embodiment of a diverse path selection system.

FIG. 1 shows a communication device 104 in a communication network 100 that includes one embodiment of a diverse path selection system 106. The network 100 comprises a data network 102 that communicates with the device 104 over a wireless communication link 108. The communication link 108 may comprise forward communication channels, reverse communication channels, control channels, paging channels, and/or any other type of data or voice communication channel. The communication network may comprise any type or combination of wired and/or wireless networks that may communicate over a wireless communication link. The device 104 may comprise virtually any type of device capable of receiving wireless transmissions, such as a mobile telephone, pager, PDA, notebook computer, desktop computer, or radio.

The device 104 comprises a first antenna 110 that operates to receive signals transmitted from the data network 102 over the wireless link 108. The device 104 also comprises a second antenna 112 that operates to receive signals transmitted from the data network 102 over the wireless link 108. In this embodiment, the antennas 110 and 112 both receive signals transmitted by the network 102, however, in other embodiments, the antennas 110 and 112 operate to receive signal transmitted from different sources. For example, the antennas may receive positioning signals, radio signals, or any other type of transmitted signal.

In one embodiment, the first antenna 110 is located outside the housing of the device 104 to provide optimal signal reception. The second antenna 112 is located within the housing of the device 104, and because of this, may offer lower performance than the first antenna 110. The first and second antennas 110, 112 comprise any suitable type, size, shape, or quality of antenna and/or antenna technology.

In one embodiment, the device 104 comprises diverse path selection logic 106 that operates to receive and process signals received by the antennas 110, 112. The diverse path selection logic 106 comprises a primary receive path to receive and process signals from the first antenna 110. The primary receive path comprises splitter 114 and primary receiver logic 116. The diverse path selection logic 106 also comprises a diverse or secondary receive path to receive and process signals from the second antenna 112. The diverse receive path comprises switch 118 and diverse receiver logic 120.

The splitter 114 comprises any suitable signal splitting logic and operates to receive a signal from the first antenna 110 and split that signal into two signals that are input to the primary receiver logic 116 and the switch 118. The switch 118 comprises any suitable switch logic and operates to receive a signal from the second antenna 112 and a signal from the splitter 114, and direct one or those signals to a switch output that is input to the diverse path receiving logic 120. Either of the two signals input to the switch 118 may be output from the switch output based on a control signal (Ctl). The primary path receiving logic 116 and the diverse path receiving logic 120 comprise any suitable type of receiving logic to receive and process signals received by the first and second antennas 110, 112.

During operation, the diverse path selection logic 106 allows the device 104 to operate in a variety of modes to process and receive transmitted signals. For example, in one embodiment, the device 104 may operate to process two information signals at the same time. For example, the device 104 may process a voice call and a GPS signal simultaneously. In another case, the device 104 may receive a multimedia signal and a paging signal. Thus, the operating modes provided by the diverse path selection logic 106 allow the device 104 to operate with enhanced functionality and flexibility. It should be noted that the following processing modes are illustrative and that other processing modes are possible within the scope of the embodiments.

Diverse Path Mode

In diverse path mode, the selection logic 106 operates to allow the device 104 to receive and process two versions of the same signal. For example, the transmitted signal may be associated with a voice call being processed by the device 104. The diverse path mode allows the receiver to overcome the effects of fading or other adverse transmission conditions by processing two versions of the voice call signal so that acceptable signal quality can be achieved. In this mode, the first antenna 110 receives the transmitted signal and inputs it to the splitter 114 of the primary receive path. The signal then flows to the primary receive logic 116 and on to be further processed by other logic at the device 104. The second antenna 112 also receives the signal, however, the signal is out of phase from the signal received at the first antenna 110. The second antenna 112 inputs the signal to the switch 118. The control signal (Ctl) controls the switch 118 to output the signal from the second antenna 112 to the diverse path receiver 120. The diverse path receiver 120 processes this signal and forwards the signal to be processed by baseband processing logic at the device 104. Thus, the two antennas 110, 112 allow two versions of the same signal to be processed to reduce the effects of fading and/or other adverse transmission effects so that the voice call can be conducted with an acceptable quality level.

Multiple Signal Mode

In multiple signal mode, the selection logic 106 allows the device 104 to receive multiple signals for processing. For example, a first signal may be received that is associated with a voice call, and a second signal may be received that is associated with a GPS signal. In one embodiment, the switch 118 is controlled so that signals received by the second antenna 112 are routed to the diverse path receiving logic 120. As a result, the primary receiving logic 116 operates to process the first signal received from the first antenna 110, and the diverse receiving logic 120 operates to process the second signal from the second antenna 112. Thus, the device 104 is able to receive and process two different information signals.

Optimized Signal Mode

In the optimized signal mode, the switch 118 is set to provide an optimal version of a signal to be processed by the diverse receiving logic 120. For example, a desired signal, such as a GPS signal, may be received on both the first and second antennas 110, 112. In one embodiment, the switch 118 is set so that the optimal version of the signal is routed to the diverse receiving logic 120. For example, in one case the second antenna may receive the signal with the better quality, and as a result, the switch 118 routes the signal from the second antenna to the diverse receiving logic 120. In another case, the first antenna 110 may receive the signal with the better quality, and as a result, the switch 118 routes the signal from the first antenna 110 to the diverse receiving logic 120. It should be noted that the processing of the signal by the diverse path occurs while the primary path processes the same or a different signal.

Therefore, the diverse path selection logic 106 allows a communication device to operate in a number of modes to provide the most efficient processing of one or more received information signals, thereby providing flexibility and performance not available in conventional devices.

Figure 2:
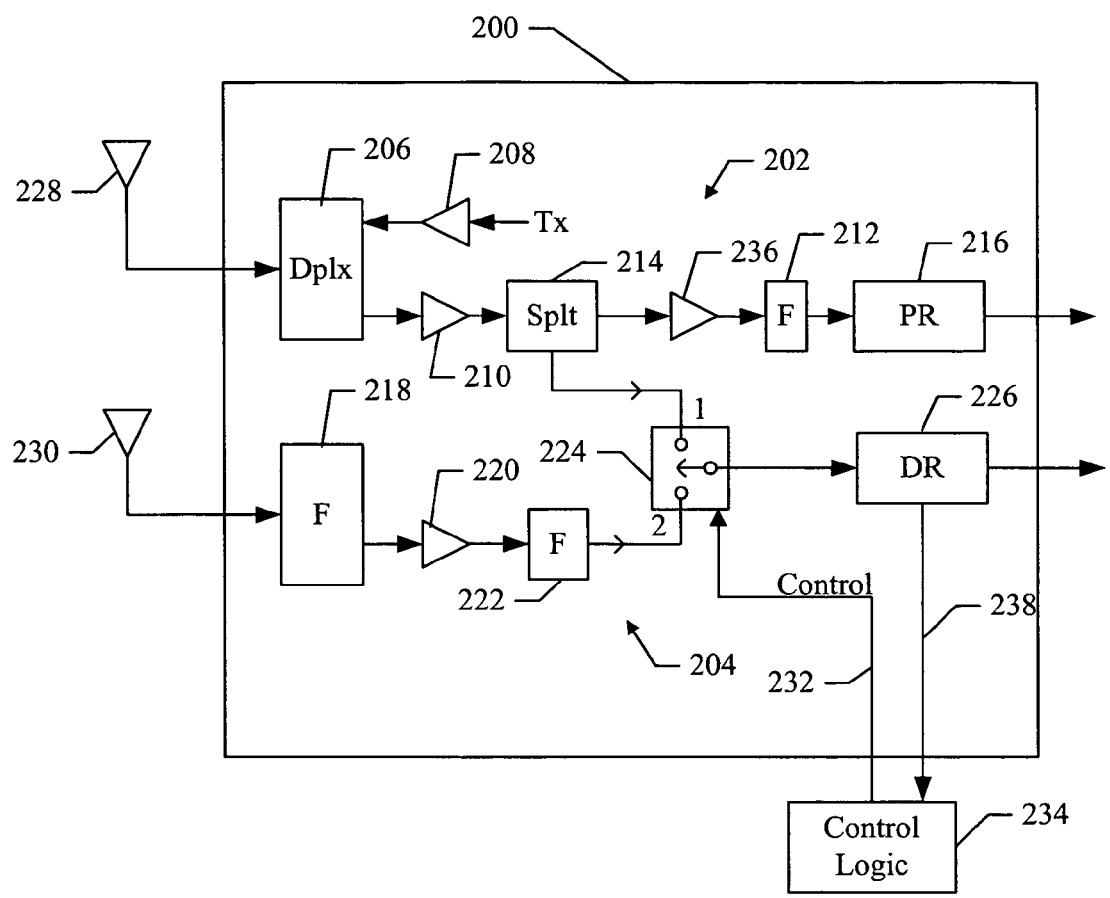
FIG. 2 shows a diagram of one embodiment of a diverse path selection system.

FIG. 2 shows a diagram of one embodiment of diverse path selection logic 200 for use in a communication device. For example, the selection logic 200 is suitable for use as the diverse path selection logic 106 shown in FIG. 1. The selection logic 200 comprises a primary receive path, shown generally at 202, and a diverse receive path, shown generally at 204.

In one embodiment, the primary receive path 202 comprises a duplexer 206, transmit and receive amplifiers (208, 210), signal splitter 214, amplifier 236, filter 212 and primary receive logic 216. The diverse receive path 204 comprises filter 218, receive amplifier 220, filter 222, switch 224, and diverse receive logic 226. It will be assumed that the primary receive path 202 is coupled to a first antenna 228, and that the diverse receive path 204 is coupled to a second antenna 230. In one embodiment, the first antenna 228 is located outside the housing of the communication device and the second antenna is located within the housing of the communication device. As a result, the first antenna 228 and the primary receive path 202 operate to provide superior performance over the second antenna 230 and the diverse receive path 204.

Signals received at the first antenna 228 flow through the duplexer 206 and receive amplifier 210 to the splitter 214. The splitter 214 comprises any suitable logic, circuitry or other technology that operates to split an input signal into two output signals. The splitter 214 operates to split the signal input into signals that are input to the amplifier 236 and a first terminal of the switch 224.

Signals received at the second antenna 230 flow through the filter 218, receive amplifier 220, and filter 222 to a second terminal of the switch 224. The switch 224 comprises any suitable switch technology and may include logic, discrete components, and/or solid-state circuitry that meet desirable linearity requirements. The switch 224 operates to switch one of the signals at its inputs to a switch output, so that the selected signal flows to the diverse receive logic 226. In one embodiment, the switch 224 operates to select one of the signals at its inputs based on a control signal 232. In one embodiment, control logic 234 at the device provides the control signal 232. However, the control signal 232 may also be provided by the primary receive logic 216, the diverse receive logic 226, or any other logic operating at the device.

During operation, the diverse path selection logic 200 operates to determine how signals received at the antennas 228, 230 are routed to the diverse receive logic 226. For example, in one embodiment, the selection logic 200 selects how signals are routed to the diverse receive logic 226 based on the operating mode of the device. For example, if the operating mode is set to diverse path mode, then the control logic 234 controls the switch 224 to route the signals received on the antenna 230 to the diverse receive logic 226. If the mode is set to multiple signal mode, then the control logic 234 controls the switch 224 to route the signals received on the antenna 230 to the diverse receive logic 226. If the mode is set to optimized signal mode, then the control logic 234 controls the switch 224 so that an optimal version of a signal received on both antennas 228, 230 is routed to the diverse receive logic 226. For example, if a selected signal is received on both antennas 228, 230, then the control logic 234 will control the switch 224 so that the higher quality version of the signal is routed to the diverse receive logic 226.

In one embodiment, the diverse path selection logic 200 comprises a signal-bearing medium tangibly embodying a program of machine-readable instructions executable by a digital processing apparatus to perform the functions described herein. For example, instructions may be loaded into the selection logic 200 from a computer-readable media, such as a floppy disk, CDROM, memory card, FLASH memory device, RAM, ROM, or any other type of memory device or computer-readable media that interfaces to the selection logic 200. In another embodiment, the instructions may be downloaded into the selection logic 200 from a network resource. The instructions, when executed by the selection logic 200, provide one or more embodiments of a diverse path selection system as described herein.

It should be understood that the elements of the selection logic 200 shown in FIG. 2 represent just one embodiment, and that implementation of the selection logic 200 could be achieved in one of any number of ways using greater or fewer functional elements. For example, some or all of the function elements shown could be implemented in hardware or in a computer program executed by one or more processors.

Figure 3:
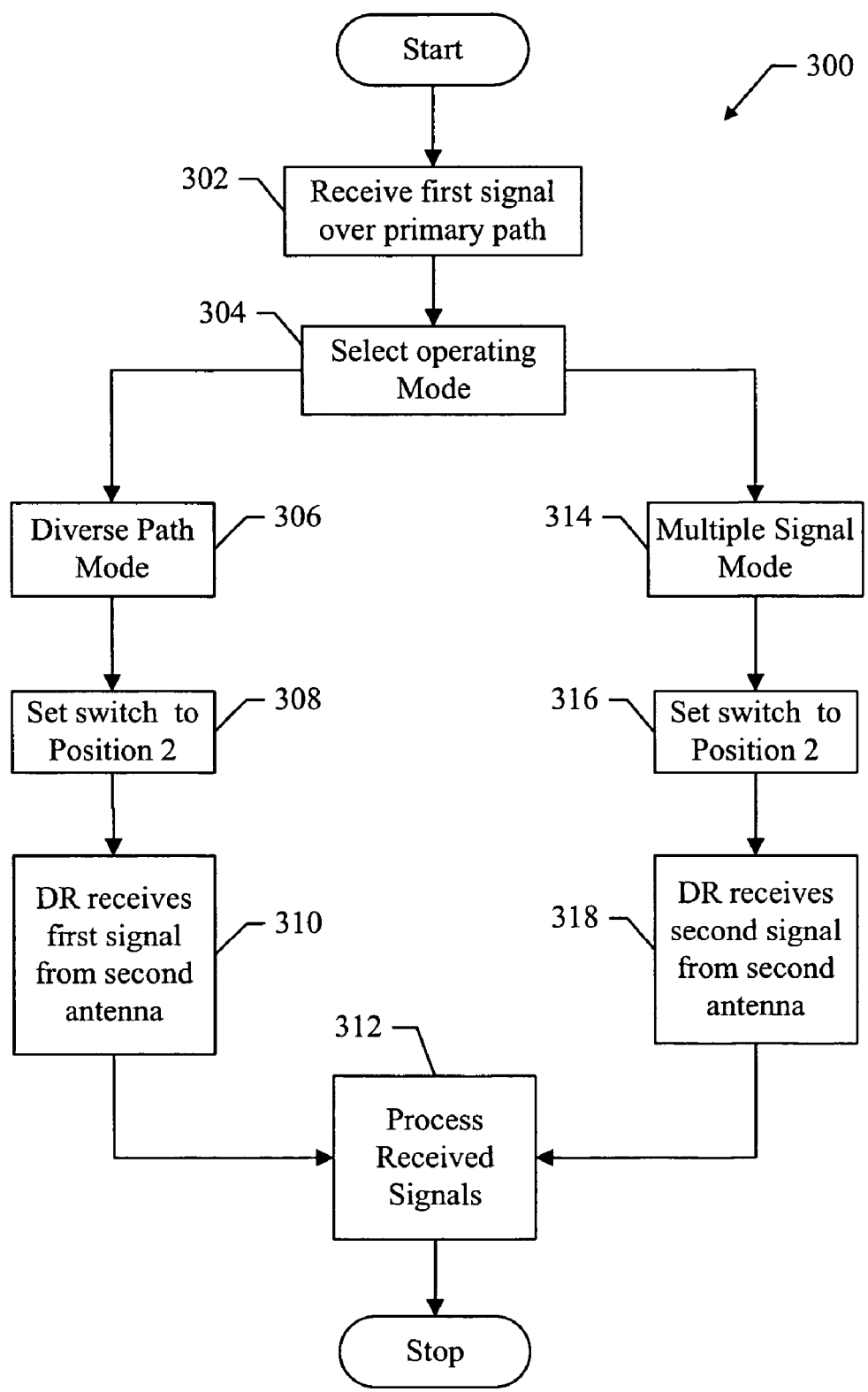
FIG. 3 shows one embodiment of a method for providing diverse path selection in a communication device.

FIG. 3 shows one embodiment of a method 300 for operating a diverse path receiving system for use in a communication device. The method 300 operates to allow device to process received signals in either diverse path mode or multiple signal mode. The method 300 is suitable for use by one or more embodiments of the diverse path receiving logic 200 shown in FIG. 2.

At block 302, a first signal is received by the device using a primary receive path. For example, the first signal may be a voice call signal that is received via the first antenna 228 and processed by the primary receiver 216.

At block 304, an operating mode for the device is selected. For example, logic at the device selects an operating mode to provide selected functionality to the terminal user. One of two modes are selected, namely; diverse path mode or multiple signal mode. It should be noted that other modes are possible within the scope of the embodiments.

At block 306, the diverse path mode is selected. For example, the diverse path mode is selected to allow the device to receive two versions of the same signal so that the versions may be processed together to counter the effects of fading and/or other degrading transmission effects.

At block 308, signals from a second antenna are routed to a diverse path receiver. For example, the switch 224 is set to position 2 to operate in diverse path mode. For example, the control logic 234 sets the control signal 232 to control the switch 224 to select position 2. This allows signals received by the second antenna to be routed to the diverse receive logic 226.

At block 310, signals received by the second antenna are routed to the diverse receive logic 226. This allows the terminal to perform diverse path processing because the diverse receive logic 226 receives a version of the same signal that is receive by the primary receive logic 216. The method then proceeds to block 312 where the received signals are processed accordingly.

At block 314, multiple signal mode is selected. For example, the terminal may operate to process a voice call and a GPS signal. The multiple signal mode is selected to allow the terminal to receive two different signals for processing.

At block 316, the switch is set to position 2 to operate in multiple signal mode. For example, the control logic 234 sets the control signal 232 to control the switch 224 to select position 2. This allows signals received by the second antenna 230 to be routed to the diverse receive logic 226.

At block 308, signals received by the second antenna are routed to the diverse receive logic 226. This allows the terminal to perform multiple signal processing because the diverse receive logic 226 receives a different signal than the primary receive logic 216. The method then proceeds to block 312.

At block 312, the signals are processed by the device based on the selected operating mode. It should be noted that the method 300 is just one embodiment and that changes, additions, deletions, or rearrangements of the method 300 are within the scope of the described embodiments.

Figure 4:
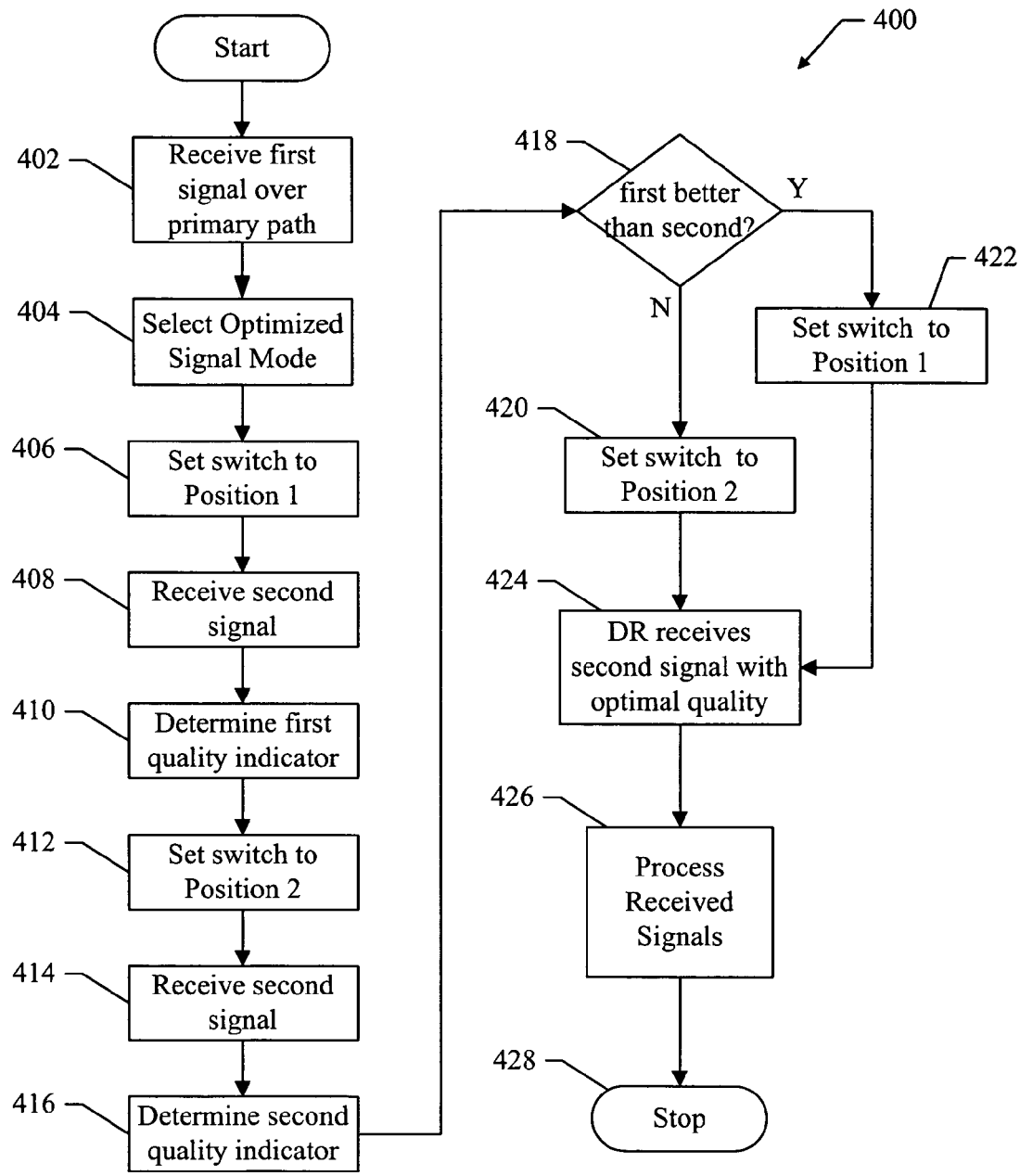
FIG. 4 shows one embodiment of a method for providing diverse path selection in a communication device.

FIG. 4 shows one embodiment of a method 400 for operating a diverse path receiving system for use in a communication device. The method 400 operates to allow a communication device to process received signals in optimized signal mode. The method 400 is suitable for use by one or more embodiments of the diverse path selection logic 200 shown in FIG. 2.

At block 402, a first signal is received by the device using a primary receive path. For example, the first signal may be a voice call signal that is received via the first antenna 228 and processed by the primary receiver 216.

At block 404, the optimized signal mode is selected. For example, the device may be operating to process a voice call and a paging message. The optimized signal mode is selected to allow the device to receive two different signals so that second signal is received with the best quality possible. For example, the second signal may be received on either of the two antennas, and the optimized signal mode allows the signal to be received on the antenna that provides the better quality.

At block 406, a switch is set to select the first antenna to receive the desired second signal. For example, the control logic 234 sets the control signal 232 to control the switch 224 to select switch position 1. This causes signals received by the first antenna to be routed to the diverse receive logic 226.

At block 408, the desired second signal is received by the first antenna and routed to the diverse receive logic 226.

At block 410, a first quality indicator is determined. The diverse receive logic 226 operates to determine a first quality indicator associated with the received second signal. In one embodiment, the quality indicator is a signal strength indicator, however, any suitable quality indicator may be determined.

At block 412, a switch is set to select the second antenna to receive the desired second signal. For example, the control logic 234 sets the control signal 232 to control the switch 224 to select switch position 2. This causes signals received by the second antenna to be routed to the diverse receive logic 226.

At block 414, the desired second signal is received by the second antenna and routed to the diverse receive logic 226.

At block 416, a second quality indicator is determined. The diverse receive logic 226 operates to determine a second quality indicator associated with the received second signal. In one embodiment, the quality indicator is a signal strength indicator, however, any suitable quality indicator may be determined.

At block 418, a test is performed to determine which antenna has received the desired second signal with the better quality. For example, the diverse receive logic 226 operates to compare the first and second quality indicators to determine which antenna is receiving the desired second signal with better quality. In another embodiment, receiving logic in the device, such as baseband processing logic, operates to determine and compare the signal quality indicators. For example, any number of indicators or parameters may be used to determine which received signal has the better quality. For example, the logic may look at in-band power based on signal magnitude. Thus, any suitable signal quality indicators may be used to determine which antenna is providing the desired signal with the better quality. If it is determined that the first antenna is receiving the desired second signal with better quality, the method proceeds to block 422. If it is determined that the second antenna is receiving the desired second signal with better quality, the method proceeds to block 420.

At block 420, the second antenna is selected to receive the desired second signal. For example, the diverse receive logic 226 indicates the desired switch setting to the control logic 234 via the signal at 238. The control logic 234 then sets the control signal 232 to control the switch 224 to select switch position 2. The method then proceeds to block 424.

At block 422, the first antenna is selected to receive the desired second signal. For example, the diverse receive logic 226 indicates the desired switch setting the control logic 234 via the signal at 238. the control logic 234 then sets the control signal 232 to control the switch 224 to select switch position 1. The method then proceeds to block 424.

At block 424, the desired second signal is received with the best signal quality and routed to the diverse receive logic 226. At block 428, the device processes the received first and second signals as desired.

It should be noted that the method 400 is just one embodiment and that changes, additions, deletions, or rearrangements of the method 400 are within the scope of the described embodiments. For example, the method 400 may be combined with one or more functions of the method 300 within the scope of the described embodiments.

In another embodiment, the method 400 is adjusted so that the primary antenna 228 is always selected to provide its received signal to the diverse receive logic 226. For example, the switch 224 is set to position 1 whenever the optimized signal mode is activated.

A diverse path antenna selection system for selecting signals to be processed by a diverse path in a communication device has been presented. Accordingly, while one or more embodiments of the diverse path selection system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

I claim:

1. A method for receiving a signal in a communication device having first and second antennas, the method comprising:

operating in a selected one of a plurality of modes comprising an optimized signal mode;

wherein the act of operating in the selected one of the plurality of modes comprises operating in the optimized signal mode comprising receiving a first version of the signal using the first antenna;

receiving a second version of the signal using the second antenna;

determining a first quality indicator and a second quality indicator associated with the first and second versions of the signal, respectively;

selecting one of the first and second versions of the signal to process based on the first and second quality indicators;

processing the first version of the signal in a primary receiver;

processing the selected one of the first and second versions of the signal in a secondary receiver; and determine a first information signal based on the selected one of the first and second versions of the signal.

2. The method of claim 1, wherein the first and second versions of the signal each comprise a common information signal.

3. The method of claim 1, wherein the first version of the signal further comprises a second information signal.

4. The method of claim 3, wherein the first and second information signals comprise different ones of a GPS signal and a voice signal.

5. The method of claim 3, wherein the act of operating in the optimized signal mode further comprises determining the second information signal based on the first version of the signal.

6. The method of claim 1, wherein the plurality of modes further comprises a diverse path mode and wherein the act of operating in the selected one of the plurality of modes further comprises operating in the diverse path mode comprising:

receiving a first version of a second signal using the first antenna;

receiving a second version of the second signal using the second antenna;

processing the first version of the second signal in a primary receiver;

processing the second version of the second signal in a secondary receiver; and determining a second information signal based on both the firstand second versions of the second signal.

7. The method of.claim 1, wherein the plurality of modes further comprises a multiple signal mode and wherein the act of operating in the selected one of the plurality of modes further comprises operating in the multiple signal mode comprising:

receiving a third signal using the first antenna, wherein the third signal comprises a third information signal;

receiving a fourth signal using the second antenna, wherein the fourth signal comprises a fourth information signal;

processing the third signal in a primary receiver;

processing the fourth signal in a secondary receiver;

determining the third information signal based on the third signal; and determining the fourth information signal based on the fourth signal.

8. A communication device having two receive paths, the device comprising:

a primary antenna;

a secondary antenna;

a splitter comprising an input coupled to the primary antenna, a first output port and a second output port;

a switch comprising a first input port coupled to the first output port of the splitter, a second input port coupled to the secondary antenna, an output port, and an input control port, wherein the switch selectively couples one of the first and second input ports to the output port based on a signal at the input control port;

control logic comprising an output port coupled to the input control port of the switch;

a primary receiver coupled to the second output port of the splitter; and a secondary receiver coupled to the output port of the switch;

wherein the two receive paths are simultaneously operational for each of the plurality of modes.

9. The device of claim 8, further comprising a housing, wherein the primary antenna is positioned at least partially external to the housing, and wherein the secondary antenna is incorporated within the housing.

10. The device of claim 8, further comprising logic to determine, in a diversity path mode, an information signal based on first version of a signal received from the primary antenna and second version of the signal received from the secondary antenna.

11. The device of claim 8, further comprising logic to determine, in a multiple signal mode, a first information signal based on a first signal received from the primary antenna, and a second information signal based on a second signal received from the primary antenna.

12. The device of claim 8, further comprising logic to determine, in an optimized signal mode:

a first information signal based on a first signal received from the primary antenna; and a second information signal based on a selected one of the first signal received from the primary antenna and a second signal received from a selected one of the primary and secondary antennas.

13. A communication device, the device comprising:

first and second antennas;

means for operating in a selected one of a plurality of modes comprising an optimized signal mode;

wherein the means for operating in the selected one of the plurality of modes comprises means for operating in the optimized signal mode comprising means for receiving a first version of the signal using the first antenna;

means for receiving a second version of the signal using the second antenna;

means for determining a first quality indicator and a second quality indicator associated with the first and second versions of the signal, respectively;

means for selecting one of the first and second versions of the signal to process based on the first and second quality indicators;

means for processing the first version of the signal in a primary receiver;

means for processing the selected one of the first and second versions of the signal in a secondary receiver; and means for determine a first information signal based on the selected one of the first and second versions of the signal.

14. The device of claim 13, wherein the first and second versions of the signal each comprise a common information signal.

15. The method of claim 13, wherein the first version of the signal further comprises a second information signal.

16. The method of claim 15, wherein the first arid second information signals comprise different ones of a GPS signal and a voice signal.

17. The method of claim 15, wherein the means for operating in the optimized signal mode further comprises means for determining the second information signal based on the first version of the signal.

18. The method of claim 13, wherein the plurality of modes further comprises a diverse path mode and wherein the means for operating in the selected one of the plurality of modes further comprises means for operating in the diverse path mode comprising:
- means for receiving a first version of a second signal using the first antenna;
- means for receiving a second version of the second signal using the second antenna;
- means for processing the first version of the second signal in a primary receiver;
- means for processing the second version of the second signal in a secondary receiver; and
- means fot determining a second information signal based on both the first and second versions of the second signal.

19. The method of claim 13, wherein the plurality of modes further comprises a multiple signal mode and wherein the means for operating in the selected one of the plurality of modes further comprises means for operating in the multiple signal mode comprising:
- means for receiving a third signal using the first antenna, wherein the third signal comprises a third information signal;
- means for receiving a fourth signal using the second antenna, wherein the fourth signal comprises a fourth information signal;
- means for processing the third signal in a primary receiver;
- means for processing the fourth signal in a secondary receiver;
- means for determining the third information signal based on the third signal; and
- means for determining the fourth information signal based on the fourth signal.

20. A computer-readable medium tangibly embodying a program of machine-readable instructions executable by a digital processing apparatus to perform a method for receiving signals in a communication device having first and second antennas, said method comprising operations of:
- operating in a selected one of a plurality of modes comprising an optimized signal mode;
- wherein the act of operating in the selected one of the plurality of modes comprises operating in the optimized signal mode comprising
  - receiving a first version of the signal using the first antenna;
  - receiving a second version of the signal using the second antenna;
  - determining a first quality indicator and a second quality indicator associated with the first and second versions of the signal, respectively;
  - selecting one of the first and second versions of the signal to process based on the first and second quality indicators;
  - processing the first version of the signal in a primary receiver; processing the selected one of the first and second versions of the signal in a secondary receiver; and
  - determine a first information signal based on the selected one of the first and second versions of the signal.

21. The computer-readable medium of claim 20, wherein the first and second versions of the signal each comprise a common information signal.

22. The computer-readable medium of claim 20, wherein the first version of the signal further comprises a second information signal.

23. The computer-readable medium of claim 22, wherein the first and second information signals comprise different ones of a GPS signal and a voice signal.

24. The computer-readable medium of claim 22, wherein the act of operating in the optimized signal mode further comprises determining the second information signal based on the first version of the signal.

25. The computer-readable medium of claim 20, wherein the plurality of modes further comprises a diverse path mode and wherein the act of operating in the selected one of the plurality of modes further comprises operating in the diverse path mode comprising:
- receiving a first version of a second signal using the first antenna;
- receiving a second version of the second signal using the second antenna;
- processing the first version of the second signal in a primary receiver;
- processing the second version of the second signal in a secondary receiver; and
- determining a second information signal based on both the first and second versions of the second signal.

26. The computer-readable medium of claim 20, wherein the plurality of modes further comprises a multiple signal mode and wherein the act of operating in the selected one of the plurality of modes further comprises operating in the multiple signal mode comprising:
- receiving a third signal using the first antenna, wherein the third signal comprises a third information signal;
- receiving a fourth signal using the second antenna, wherein the fourth signal comprises a fourth information signal;
- processing the third signal in a primary receiver;
- processing the fourth signal in a secondary receiver;
- determining the third information signal based on the third signal; and
- determining the fourth information signal based on the fourth signal.

27. A method for receiving a signal in a communication device having first and second antennas, the method comprising:
- operating in a selected one of a plurality of modes comprising an optimized signal mode, a diverse path mode and a multiple signal mode;
- wherein the act of operating in the selected one of the plurality of modes comprises operating in the optimized signal mode comprising
  - receiving a first version of the signal using the first antenna;
  - receiving a second version of the signal using the second antenna;
  - determining a first quality indicator and a second quality indicator associated with the first and second versions of the signal, respectively;
  - selecting one of the first and second versions of the signal to process based on the first and second quality indicators;
  - processing the first version of the signal in a primary receiver;
  - processing the selected one of the first and second versions of the signal in a secondary receiver; and
  - determine a first information signal based on the selected one of the first and second versions of the signal;
- wherein the act of operating in the selected one of the plurality of modes further comprises operating in the diverse path mode comprising:

receiving a first version of a second signal using the first antenna;

receiving a second version of the second signal using the second antenna;

processing the first version of the second signal in a primary receiver;

processing the second version of the second signal in a secondary receiver; and determining a second information signal based on both the first and second versions of the second signal; and wherein the act of operating in the selected one of the plurality of modes further comprises operating in the multiple signal mode comprising:

receiving a third signal using the first antenna, wherein the third signal comprises a third information signal;

receiving a fourth signal using the second antenna, wherein the fourth signal comprises a fourth information signal;

processing the third signal in a primary receiver;

processing the fourth signal in a secondary receiver;

determining the third information signal based on the third signal; and determining the fourth information signal based on the fourth signal.

* * * * *

UNITED STATES PATENT AND TRADEMARK OFFICE
CERTIFICATE OF CORRECTION

| | | |
|---|---|---|
| PATENT NO. | : 7,639,999 B2 | Page 1 of 1 |
| APPLICATION NO. | : 11/102064 | |
| DATED | : December 29, 2009 | |
| INVENTOR(S) | : Raymond C. Wallace | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 793 days.

Signed and Sealed this

Twenty-first Day of December, 2010

David J. Kappos
*Director of the United States Patent and Trademark Office*